US012775586B2

(12) United States Patent
Oakley et al.

(10) Patent No.: US 12,775,586 B2
(45) Date of Patent: Oct. 27, 2026

(54) NETWORK FILE DEDUPLICATION USING DECAYING BLOOM FILTERS

(71) Applicant: MORGAN STANLEY SERVICES GROUP INC., New York, NY (US)

(72) Inventors: Jonathan Oakley, Woodruff, SC (US); Joseph Edmonds, Ellicott City, MD (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/377,287

(22) Filed: Oct. 5, 2023

(65) Prior Publication Data

US 2024/0045836 A1 Feb. 8, 2024

Related U.S. Application Data

(63) Continuation of application No. 17/503,252, filed on Oct. 15, 2021, now Pat. No. 11,809,378.

(51) Int. Cl.

| | |
|---|---|
| ***G06F 16/174*** | (2019.01) |
| ***G06F 16/14*** | (2019.01) |
| ***G06F 16/172*** | (2019.01) |

(52) U.S. Cl.

CPC ........ *G06F 16/1748* (2019.01); *G06F 16/148* (2019.01); *G06F 16/172* (2019.01)

(58) Field of Classification Search

None

See application file for complete search history.

(56) References Cited

U.S. PATENT DOCUMENTS

| | | | |
|---|---|---|---|
| 8,762,352 | B2 | 6/2014 | Amit et al. |
| 9,092,447 | B1 | 7/2015 | Anderson et al. |
| 9,122,407 | B2 | 9/2015 | Tsuchiya et al. |
| 9,171,153 | B2 | 10/2015 | Jorgensen |
| 9,361,327 | B1 | 6/2016 | Chen, Jr. et al. |
| 9,634,992 | B1 | 4/2017 | Rostamabadi et al. |
| 9,679,007 | B1 | 6/2017 | Feldman |

(Continued)

OTHER PUBLICATIONS

Luo et al. Optimizing Bloom Filter: Challenges, Solutions, and Comparisons. IEEE Communications Survey & Tutorials, 21:2, 2019, pp. 1912-1949. (Year: 2019).*

(Continued)

*Primary Examiner* — Hosain T Alam

(74) *Attorney, Agent, or Firm* — WEITZMAN LAW OFFICES, LLC

(57) ABSTRACT

A system for receiving and deduplicating data strings transmitted over a network is disclosed. The system comprises one or more network sensors detecting data strings while in transit on the network; and non-transitory memory comprising instructions. When the instructions are executed by one or more processors, the one or more processors establish a plurality of Bloom filters, receive a first data string, perform a first insertion operation into each Bloom filter; determine, for each of one or more Bloom filters, a set of bits, whether presently set or cleared, to be unset; and unset each determined set of bits in the one or more Bloom filters. At a later moment in time, the first data string is received again, and each Bloom filter is queried to determine whether the first data string has been inserted, based on a current state of that Bloom filter.

20 Claims, 10 Drawing Sheets

(56) References Cited

U.S. PATENT DOCUMENTS

| | | | |
|---|---|---|---|
| 10,003,574 | B1 | 6/2018 | Rostamabadi et al. |
| 10,645,002 | B2 | 5/2020 | Janakiraman et al. |
| 10,698,812 | B2 | 6/2020 | Bar-Joshua et al. |
| 10,796,092 | B2 | 10/2020 | Leibovitz |
| 10,936,590 | B2 | 3/2021 | Carter |
| 2005/0022009 | A1 | 1/2005 | Aguilera et al. |
| 2005/0033803 | A1 | 2/2005 | Vleet et al. |
| 2010/0281150 | A1 | 11/2010 | Sailhan et al. |
| 2014/0133233 | A1 | 5/2014 | Li et al. |
| 2014/0244790 | A1 | 8/2014 | Ise et al. |
| 2014/0372216 | A1 | 12/2014 | Nath et al. |
| 2015/0356196 | A1 | 12/2015 | Prasad |
| 2019/0251066 | A1 | 8/2019 | Okun et al. |

OTHER PUBLICATIONS

Nandhini et al. Malicious Website Detection Using Probabilistic Data Structure Bloom Filter. ICCMC 2019, pp. 311-316. (Year: 2019 ).*

Jambon, Martin, "Memories: Forgetful Bloom Filters", <https://github.com/mjambon/memories>, Apr. 18, 2011.

Subramanyam, Rajath, "Idempotent Distributed Counters Using a Forgetful Bloom Filter", 2015.

Jackson, Hugh, "Counters, Idempotence And Forgetful Bloom Filters", retrieved at <https://hughfdjackson.com/engineering/counters,-idempotence-and-forgetful-bloom-filters/> on Oct. 15, 2021.

Koloniari, Georgia, et al., "One is Enough: Distributed Filtering for Duplicate Elimination", 2011.

Zawoad, Shams, et al., "CURLA: Cloud-based spam URL analyzer for very large datasets", Jun. 2014.

* cited by examiner

NETWORK FILE DEDUPLICATION USING DECAYING BLOOM FILTERS

CROSS REFERENCE TO RELATED APPLICATIONS

This application is a continuation of and claims priority to U.S. patent application Ser. No. 17/503,252, filed Oct. 15, 2021, and also titled "NETWORK FILE DEDUPLICATION USING DECAYING BLOOM FILTERS", which is hereby incorporated by reference in its entirety. This application also has a sister application that claims priority to the same parent and has been filed on the same day, Oct. 5, 2023, also entitled "NETWORK FILE DEDUPLICATION USING DECAYING BLOOM FILTERS".

FIELD OF INVENTION

This disclosure relates to systems and methods for deduplication and caching, and more specifically, to systems and methods for increasing efficiency of high-volume caching of previously unseen files or other data strings, through use of multiple non-persistent Bloom filters.

BACKGROUND

With ever-evolving malware campaigns targeting various networks, institutions, and businesses, there is a perpetual need to track what files are being sent through networks and respond as quickly as possible when a file is being propagated through a network and may contain malware. Because static and dynamic analysis of potential malware is too computationally expensive to perform on every instance of every file sent, there is an evident benefit to analyzing only the first instance of a file being seen, store that analysis, and analyze subsequent files only if an analysis has not already been performed on another copy of that file. Such a method requires some form of data structure to track these past sightings for purposes of deduplication. Similar use cases exist for systems that must cache a large number of static files, like a web crawler used by a search engine, or for other deduplication in general.

One common data structure for storing whether a file has been seen before is the Bloom filter. Traditional Bloom filters are a variant of hash table where insertion involves generating K hashes of an input (for some K greater than one), and setting K corresponding bits of the hash table to true. The item itself is not stored in the Bloom filter; only a subset of bits not permitting reconstruction of the item are affected. To look up whether an item has been inserted, the K hashes are re-generated for that item and each corresponding bit of the table is checked. If all K bits are set, the item is assumed to have been inserted.

However, there is always a possibility of a false positive, as multiple items may have been inserted whose hashes collectively overlap with all K hashes of a not-inserted item. The initial probability of a false positive can be controlled before runtime by the choice of K or the choice of the number of bits M in the table, and the probability of a false positive increases at runtime as the table becomes more and more saturated with set bits. The Bloom filter is considered fully saturated when enough bits have been set that the probability of any given file receiving a false positive exceeds an acceptable threshold rate. Adding additional Bloom filters or increasing the size of existing Bloom filters reduces saturation temporarily, but if the volume of file insertions remains high for a sustained period of time, it is not a feasible long-term solution.

As a result, there are advantages to developing systems with Bloom filters that can be used for a longer period of time, or indefinitely, and with a greater number of insertions without becoming fully saturated and returning unacceptable false positives in response to queries.

SUMMARY OF THE INVENTION

A system for receiving and deduplicating data strings transmitted over a network is disclosed. The system comprises one or more network sensors detecting data strings while in transit on the network; and non-transitory memory comprising instructions. When the instructions are executed by one or more processors, the one or more processors establish a plurality of Bloom filters, receive a first file, perform a first insertion operation into each Bloom filter; determine, for each of one or more Bloom filters, a set of bits, whether presently set or cleared, to be unset; and unset each determined set of bits in the one or more Bloom filters. At a later moment in time, the first data string is received again, and each Bloom filter is queried to determine whether the first data string has been inserted, based on a current state of that Bloom filter.

Similarly, a computer-implemented method for receiving and deduplicating data strings transmitted over a network is disclosed. The method comprises establishing a plurality of Bloom filters; receiving a first data string; generating a set of distinct hashes of the first data string; performing a first insertion operation into each Bloom filter of the plurality of Bloom filters; determining, for each of one or more Bloom filters of the plurality of Bloom filters, a set of bits, whether presently set or cleared, to be unset; and unsetting each determined set of bits in the one or more Bloom filters. At a later moment in time, the method continues by receiving the first data string again and querying each Bloom filter of the plurality of Bloom filters to determine whether the first data string has been inserted, based on a current state of that Bloom filter.

Additional features include variations of the above system and method where each Bloom filter has bits unset simultaneously in a staggered sweeping pattern, where Bloom filters take turns being the only one to have bits unset, and where none of the Bloom filters is an authoritative filter that stores all the set bits that other filters may be missing. The bit unsetting process, bit selection process, Bloom filter selection process, and/or decay trigger may be based on the level of saturation of the Bloom filters, be based on the passage of time, be constant, be dynamic, be random, occur upon every insertion or a threshold of insertion counts, or be a combination of these factors.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

Figure 1:
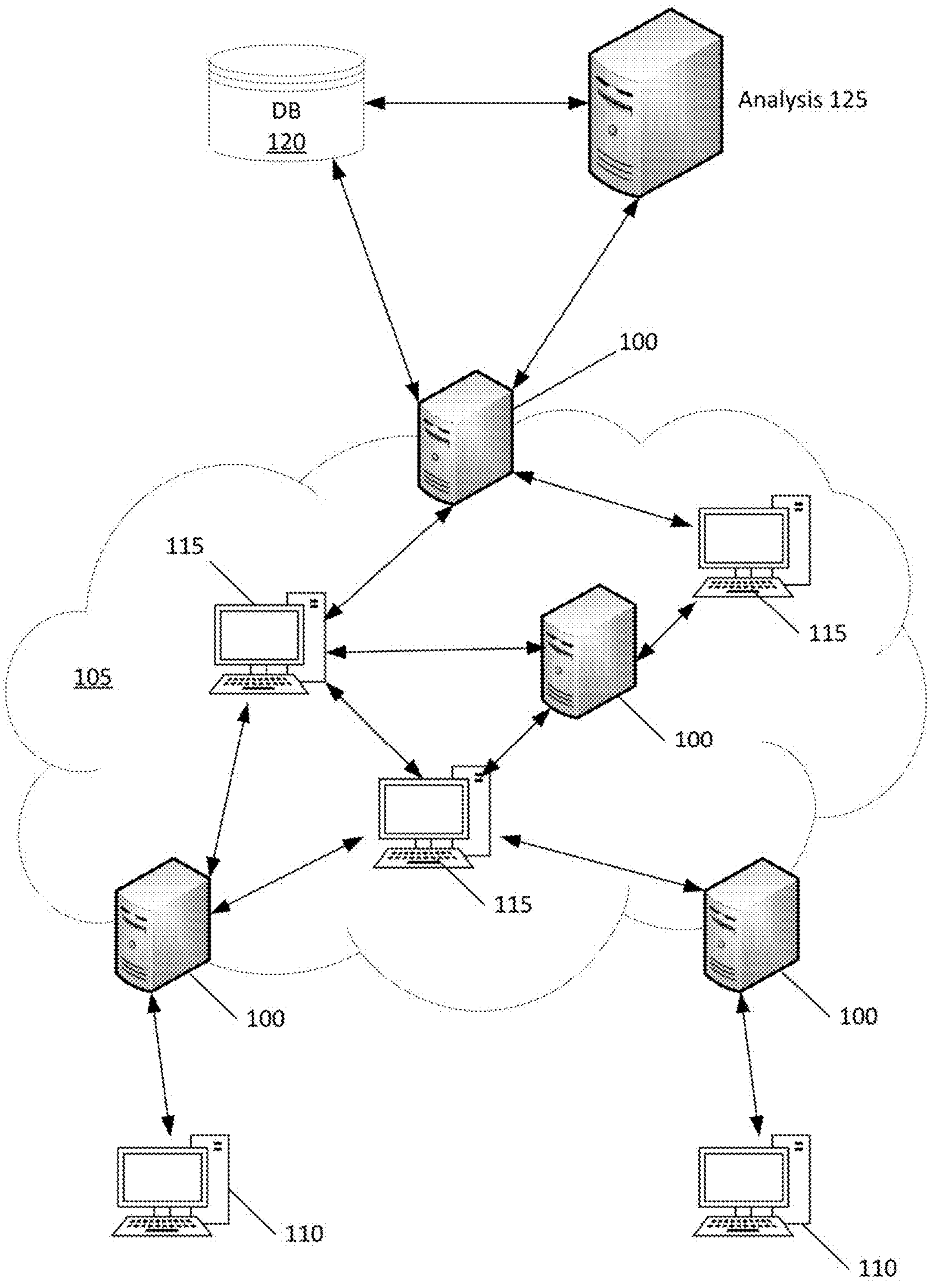
FIG. 1 illustrates, in simplified form, a system of network sensors and computing devices used to track files being transmitted through a network.

The issue of Bloom filters becoming oversaturated over a period of time may be addressed by creating a system in which multiple Bloom filters are used simultaneously, and over time, differing subsets of bits in each Bloom filter are permitted to "decay" and are unset back to a false value. When the system performs a deduplication check to see if a file has been previously inserted, there is a query performed within each Bloom filter or within a selected subset of the Bloom filters (such as the set of filters that are not currently undergoing decay when decay alternates between filters), and the overall system returns a "true" on the insertion check if any of the Bloom filters queried reported a "true." The decaying process may ultimately result, given enough time, in a false negative result for every item that has previously been inserted into the Bloom filters without being refreshed by repeated sightings. However, this trade-off of a small increase in false negatives for a massive decrease in false positives, achieved without infinitely expanding the size of the Bloom filters, can have benefits in specific use cases.

For example, malware analysis on all files transmitted over a network is a scenario where there will be a sustained, extremely high volume of insertions and deduplication checks, but if a file is ever transmitted on the network again, it is most likely to happen within the first few days after its first insertion (when an email is forwarded, or when a download link has been sent to multiple recipients and each recipient downloads it shortly after receipt). After the initial burst of transmissions or downloads, the new file is relatively unlikely to be seen again. If the new file does happen to be seen again after that initial period of time, it may be an acceptable outcome to re-perform any computation associated with a "new" file, or at least to send the file to a second level of deduplication that is more rigorous and slower than the Bloom filter lookup. As used throughout this disclosure, a "false positive" is a response to the question "Has this file been encountered before?" with "Yes" when the file is entirely novel, and a "false negative" is a response to the question "Has this file been encountered before?" with "No" with the file has previously been received.

When bits are periodically unset in the Bloom filters being used for deduplication, it is possible to avoid full saturation. As a result, when a new file comes along that has never been seen before, the probability of a false positive due to saturation and subsequent ignoring of the file is minimized. If a file comes along which has already been seen, during the initial minutes, hours, or days since the last time it was seen (when it is most likely to be seen again), a false negative for that file will be least likely and the file will not be needlessly re-analyzed, and only later, after the file is not likely to be seen again, will bits be unset and increase the chance that a false negative occurs. In the framework of malware analysis, a false positive is much more damaging than a false negative, since a false negative leads to re-analysis of an already encountered file and waste of resources, but a false positive leads to throwing away a file the first time it is encountered, when its information might have been sorely needed to analyze as a possible threat.

Unlike a traditional Bloom filter, a countably infinite number of insertions can be performed without the false positive rate approaching 100%, at the cost of a probabilistic chance that a false negative will occur, but with the guarantee that a false negative will not occur for at least a minimum number of insertions or a minimum window of time. Also, unlike traditional multi-filter setups, no filter is defined as the unique authoritative filter that has a superset of all other filters' bits and is used to confirm a "not before seen" determination when a Bloom filter with fewer set bits fails to confirm a sighting. Instead, each filter has different, partially overlapping sets of bits that have been changed to true, and each is consulted and given equal weight.

FIG. 1 illustrates, in simplified form, a system of network sensors and computing devices used to track files being transmitted through a network.

With reference now to FIG. 1, a number of network sensors 100 may be distributed at the edges of or internal to some form of data network 105. The network 105 may be any form or wired or wireless network, including a LAN, WLAN, VPN, ethernet, portion of the Internet, etc. The network sensors 100 are capable of intercepting communications between computers 110 outside the network and computers 115 inside the network, or between two or more computers 115 inside the network. The network sensors 100 are, in a preferred embodiment, low-latency routers or network taps that make a copy of network traffic before forwarding the packets to their destination, though in other embodiments, they may be off-the-shelf routers configured to run additional custom software, or may even be general purpose computing devices or servers.

In some embodiments, related specifically to malware analysis, one or more of the network sensors 100 may be in communication with a database 120 (for caching files if the network sensor 100 determines the file has not been seen before, or for acting as a second round of deduplication if the network sensor wants to confirm that the file has not been seen before) and/or an analysis system 125. Upon receiving a new file, the network sensor 100 may transmit the file to the database 120 or the analysis system 125, so that the database 120 may update its cache to include the file, and so that the analysis system 125 may begin performing static or dynamic analysis upon it as possible malware (for example, checking the file for suspicious substrings or running the file in a sandbox environment to determine its behavior).

The network sensors 100 and analysis system 125 may have connections to one or more external computing systems via the network 105 or other networks, for various purposes such as notifying human users or third party systems that a file has been seen, that one or more analyses has been performed, and/or what the results of the analyses were.

Although a particular division of functions between devices is described above with relation to the systems depicted in FIG. 1, other configurations are possible in which functions are divided among devices differently. For example, all of the functions of some or all of a network sensor 100, the database 120, and the analysis system 125 may be performed by a single device with multiple threads executing different software modules simultaneously.

Alternatively, the database 120 and/or analysis system 125 may in fact be a cluster of computing devices sharing functionality for concurrent processing. Further, although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme.

Figure 2:
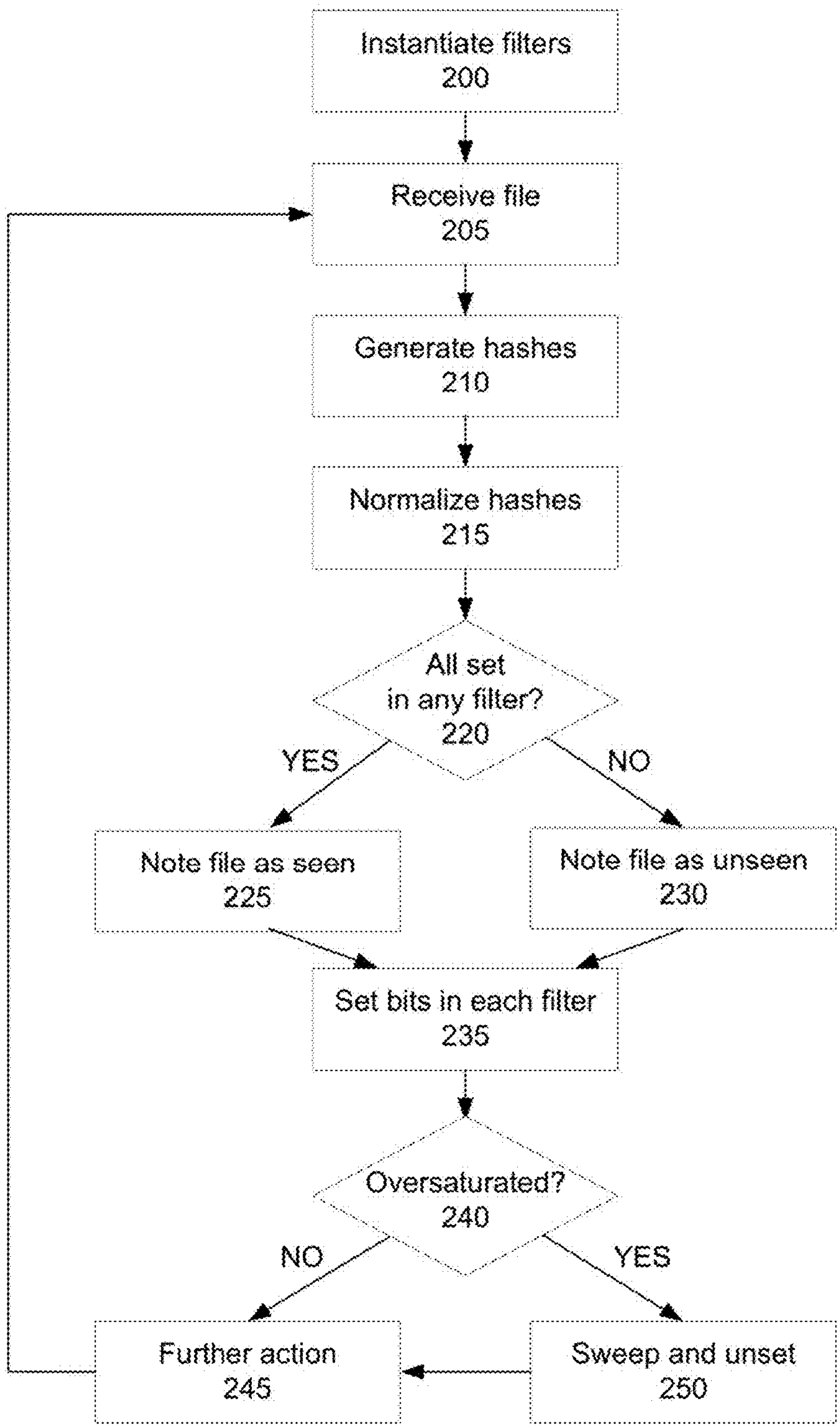
FIG. 2 illustrates, in simplified form, a method for checking whether a file has been seen before and inserting it into or updating it within a set of Bloom filters.

Running on each of the network sensors 100 is the software for file deduplication that informs the later analysis of the file or other use of the file. FIG. 2 illustrates, in simplified form, a method for checking whether a file has been seen before and inserting it into or updating it within a set of Bloom filters.

First, at least two Bloom filters are instantiated (Step 200) to record instances of files being observed in the network 105. In some embodiments, only two Bloom filters are created, while in others, three, four, five, or even more Bloom filters may be instantiated, depending on desired trade-offs of size, speed, and accuracy. Note that, while in all preferred embodiments multiple Bloom filters are established, it is possible for the principles described herein to be applied to a single Bloom filter, though the advantages of maintaining multiple Bloom filters with different sets of bits will naturally be lost if only one Bloom filter is utilized.

Next, a network sensor 100 directly observes or otherwise receives a file (Step 205) for which a determination should be made whether the file has previously been observed or received.

Upon receiving the file, for some predetermined value K, K distinct hashes of the file are generated (Step 210). In a preferred embodiment, a same hash function, such as MD5 or SHA-256, is performed to obtain each of the K distinct hashes, and the distinct values are the result of appending K distinct salts to the file before each hashing. In other embodiments, the K distinct hashes may be the result of using K distinct hash functions, or by performing K distinct transformations, other than salting, to the file before evaluating the hash function. Any particular configuration of functions and transformations may be used, so long as they deterministically generate K distinct values that are intended to be randomly distributed throughout a range of equal or greater size than that of each Bloom filter. In a preferred embodiment, K may be set to 23.

If the range of values from the hash is greater than M, the number of bits in the Bloom filters, the hashes are normalized (Step 215) to the range of 1 to M, preferably by taking their value modulus M (i.e., K % M).

Each Bloom filter is checked at each of the hash values (K % M) to see if each such bit is already set (Step 220). If they are all set within any of the Bloom filters, the method records that the file is assumed to have been seen before (Step 225); otherwise, when every Bloom filter has at least one of the bits unset, the method records that the file is assumed not to have been seen before (Step 230).

Regardless of the status of each of the bits and the overall determination, the bits at each of the hash values are set to true in each of the Bloom filters (Step 235). In an alternative embodiment, the bits may only be set in a selected subset of the Bloom filters, so that some of the Bloom filters remain unchanged after an insertion.

Next, the current saturation of the Bloom filters is checked (Step 240). If the saturation does not exceed a predetermined threshold, the prior determination is used as the basis for any necessary further action (Step 245). For example, a determination that a file has not been seen may result in transmission of the file to the database 120 for long term storage; transmission of the file to the analysis system 125 for static and/or dynamic malware analysis; transmission of a digest or alert to a system monitoring network traffic; communication with a human user to alert that user to the situation; or any other automated or human-assisted response. Afterward, the network sensor 100 returns to waiting for another file to be observed or processing the next already-observed file waiting in a queue (back to Step 205).

If the saturation does exceed the predetermined threshold, or if no threshold is explicitly set, one or more of the Bloom filters each sweep a certain number of bits from a region of the Bloom filter and unsets each of them (Step 250). In a preferred embodiment, the decay strategy involves sweeping a same number of bits from each of the Bloom filters, though in other strategies, only a subset of the filters may be swept at a time, or unequal numbers of bits may be swept from each filter. This process may also be incorporated into a database trigger that is executed in response to each insertion, as opposed to some software or database process that is independently executed.

Figure 3:
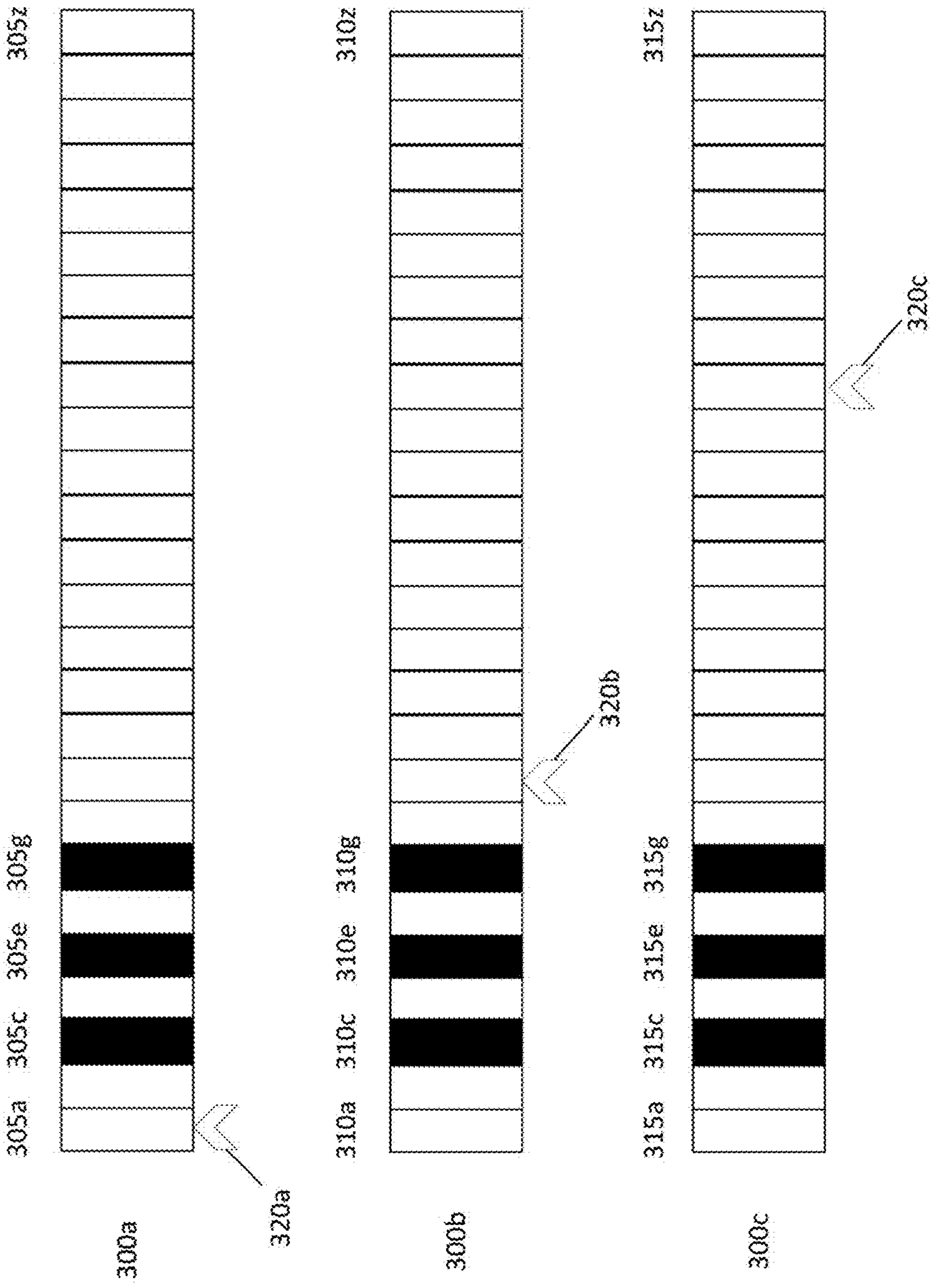
FIG. 3 illustrates, in simplified form, a set of Bloom filters after a first file insertion according to the method illustrated by FIG. 2.
Figure 4:
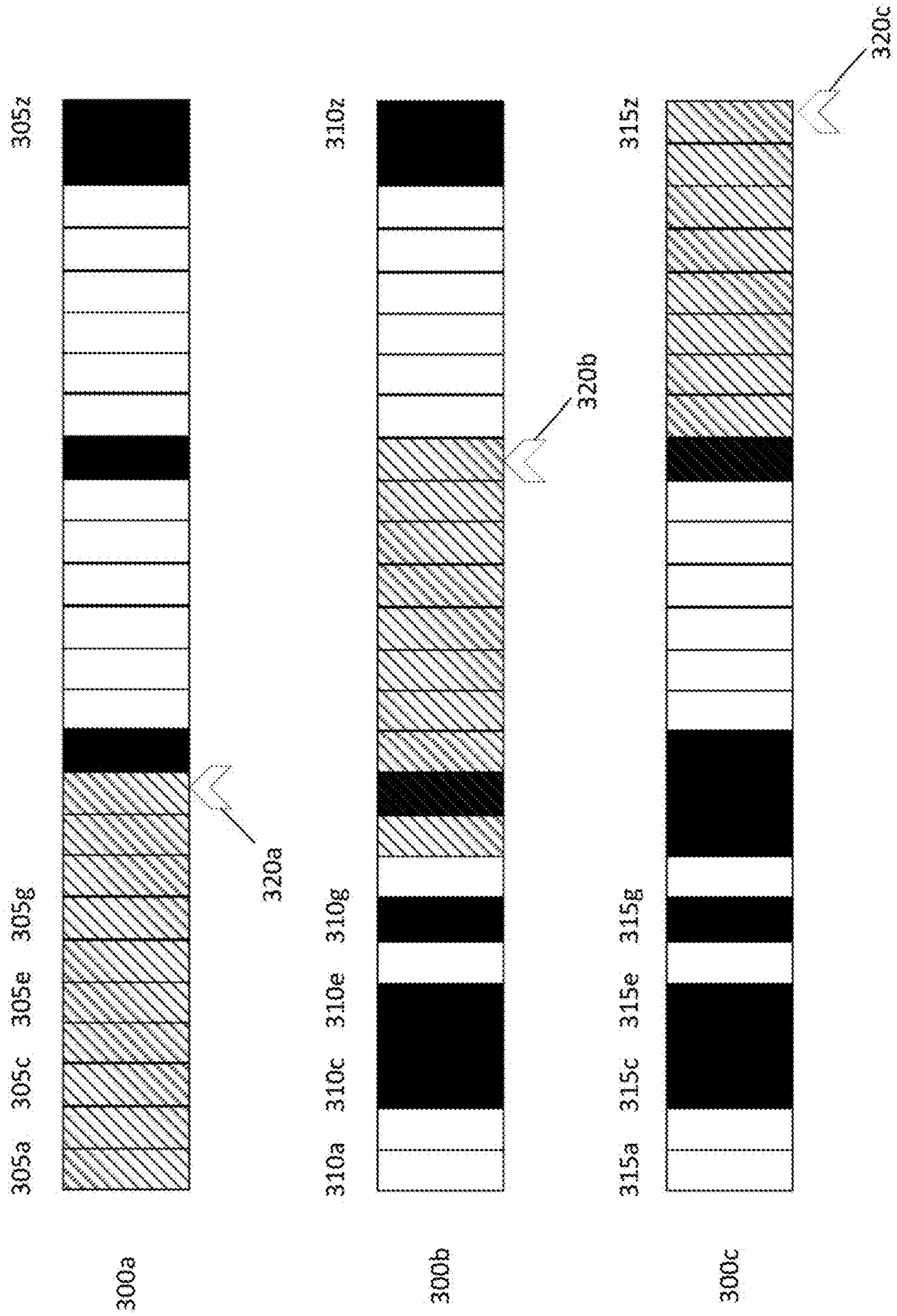
FIG. 4 illustrates, in simplified form, the set of Bloom filters from FIG. 3 after a series of insertions and a sweeping reset of bits according to the method illustrated by FIG. 2.

The number of bits may be equal to K, be equal to a fraction of K such as K/2 or 0.9K, be equal to another fixed relation with K such as (K−1) or (K−2), or may be dynamically set to however many bits would need to be unset to reduce saturation below the predetermined threshold. The region of each sweep is different in each of the Bloom filters, as illustrated in FIGS. 3 and 4 and discussed further below. In a preferred embodiment, the pointers for the sweeps are kept equidistant from each other so that, for example, in a two Bloom filter system the pointers are always M/2 bits apart, or in a three Bloom filter system the pointers are always M/3 bits apart. In other embodiments, the pointers may be permitted to update independent of one another.

The size of the sweep, if fixed rather than dynamic, may be set to achieve a particular desired saturation level for the Bloom filters. Due to the inherent randomness of the Bloom filter data structure, the sweep may reduce saturation back to the threshold, or may cause the saturation to decrease well below the threshold (for example, if an insertion exclusively set bits that were already set, yet K bits were immediately unset), or may not decrease saturation at all (if all the bits in the sweep happened to not have been set yet). However, the total saturation will stabilize at around the threshold over time as overcorrections and undercorrections cancel one another out. If a fixed number of bits are unset after each insertion, the saturation of the Bloom filters will stabilize probabilistically at a given level even if the sweep is being performed blindly without checking the saturation of the Bloom filters.

In this method, the step of insertion is described as preceding the sweep. However, the sweep could instead be ordered before the insertion/check step. Further, the insertion/check and the sweep could be decoupled, such that the sweep occurs periodically on a predetermined schedule, rather than in response to a trigger called during the insertion/check. If the two actions are decoupled, careful consideration would be required to ensure that the scheduled frequency of sweeps is sufficient to keep the saturation sufficiently low, but also does not unnecessarily destroy information if the Bloom filter bits are not refreshed by a continued stream of insertions.

After the sweep has been performed, any final actions are undertaken (Step 245), including reporting the outcome of the check for prior insertion and transmitting the file to another destination. Afterward, the network sensor 100 returns to waiting for another file to be observed or processing the next already-observed file waiting in a queue (back to Step 205).

For purposes of clarifying how the method of FIG. 2 works in practice, FIG. 3 illustrates, in simplified form, a set of Bloom filters after a first file insertion according to the method illustrated by FIG. 2.

In one example embodiment, simplified for the sake of explanation, three Bloom filters 300*a*, 300*b*, 300*c* might be established, each with 26 bits 305*a*-305*z*, 310*a*-310*z*, and 315*a*-315*z*. Each Bloom filter 300 has a persistent pointer 320*a*, 320*b*, 320*c* to a particular bit 305, 310, 315 that will be unset upon the next insertion, and the pointer 320 advanced afterward. In the depicted example, the first item inserted has three hashes determined that correspond to the third, fifth, and seventh bits (that is, $F_1(x)$ % 26=3, $F_2(x)$ % 26=5, and $F_3(x)$ % 26=7), so three bits in each Bloom filter 305*c*, 305*e*, 305*g*, 310*c*, 310*e*, 310*g*, 315*c*, 315*e*, 315*g* are set to true (shown by depicting each bit in black).

FIG. 4 illustrates, in simplified form, the set of Bloom filters from FIG. 3 after a series of insertions and a sweeping reset of bits according to the method illustrated by FIG. 2.

For the sake of depicting features of the method, let there be three subsequent items whose hashes, after reduction mod 26, are (4, 10, 18), (5, 25, 26), and (9, 10, 11). After insertion of all four items, up to 12 bits might be set in each of the Bloom filters 300, though in some instances in each table, bits previously set have been unset as the pointers 320 advance. Further, in some instances, a previously unset bit is re-set after a subsequent insertion.

After three more insertions, the pointers 320 may have each swept forward by a total of 9 bits (3 bits per insertion, in this example), in the process resetting some of the bits that had been previously set, as shown with hatching marks in FIG. 4.

Figure 5:
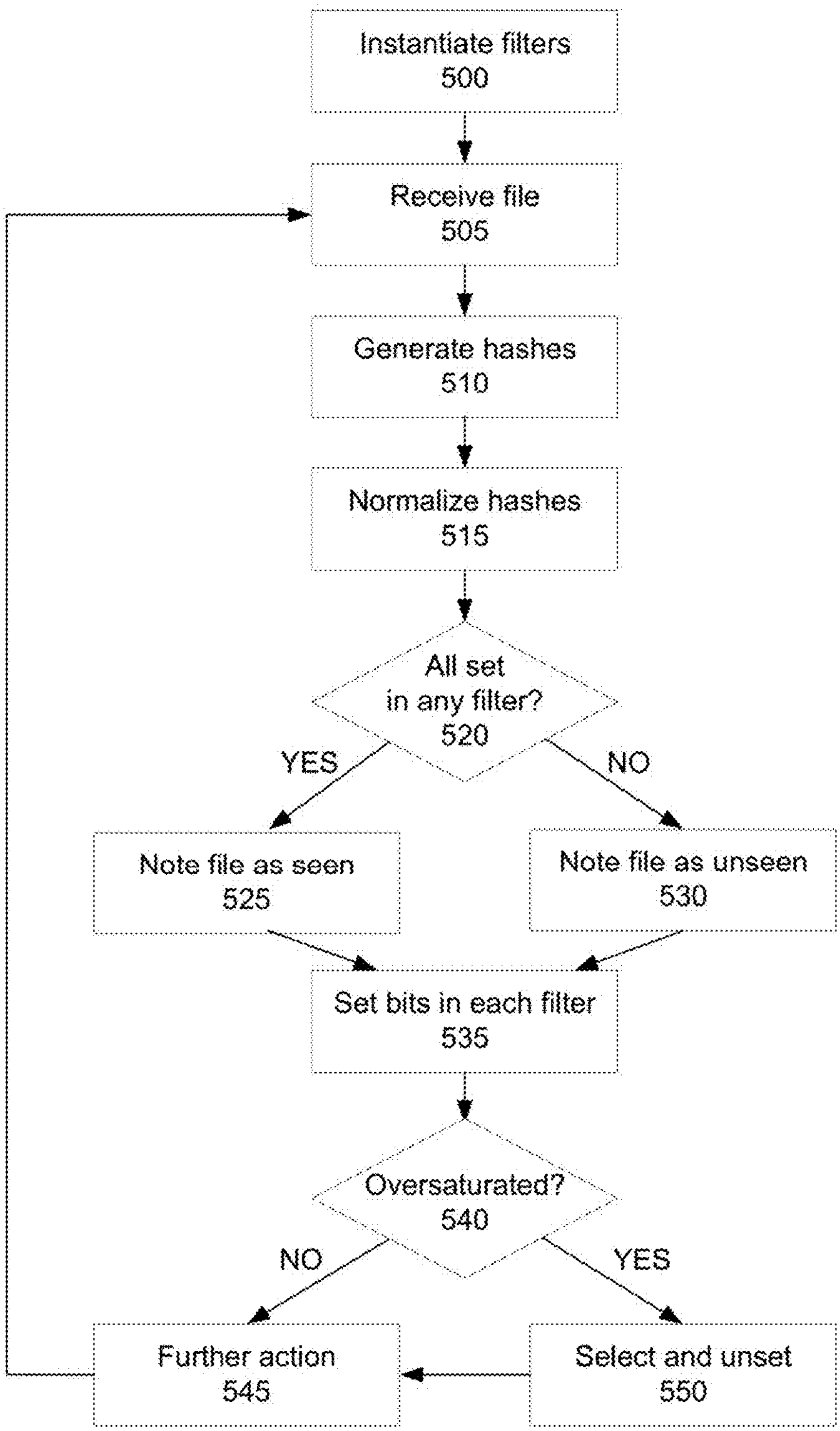
FIG. 5 illustrates, in simplified form, an alternative method for checking whether a file has been seen before and inserting it into or updating it within a set of Bloom filters.

FIG. 5 illustrates, in simplified form, an alternative method for checking whether a file has been seen before and inserting it into or updating it within a set of Bloom filters.

As in the method of FIG. 2, first, at least two Bloom filters are instantiated (Step 500) to record instances of files being observed in the network 105. In some embodiments, only two Bloom filters are created, while in others, three, four, five, or even more Bloom filters may be instantiated, depending on desired trade-offs of size, speed, and accuracy. Similarly, a network sensor 100 directly observes or otherwise receives a file (Step 505) for which a determination should be made whether the file has previously been observed or received, K distinct hashes of the file are generated by whatever method is preferred (Step 510), and the hashes are normalized to the range of 1 to M (Step 515).

Again, each Bloom filter is checked at each of the hash values (K % M) to see if each such bit is already set (Step 520). If they are all set within any of the Bloom filters, the method records that the file is assumed to have been seen before (Step 525); otherwise, when every Bloom filter has at least one of the bits unset, the method records that the file is assumed not to have been seen before (Step 530). Regardless of the status of each of the bits and the overall determination, the bits at each of the hash values are set to true in each of the Bloom filters (Step 535).

Next, the current saturation of the Bloom filters may be checked (Step 540). If the saturation does not exceed a predetermined threshold, the method ends with the prior determination being used as the basis for any further action (Step 545), as previously described above. Afterward, the network sensor 100 returns to waiting for another file to be observed or processing the next already-observed file waiting in a queue (back to Step 505).

If the saturation does exceed the predetermined threshold, or if no threshold is explicitly set, only one of the Bloom filters is selected to have a certain number of bits from a region of the Bloom filter unsets (Step 550). In one embodiment, a random process is used such that the last Bloom filter is again targeted a certain proportion of the time (such as 99% of the time) and in the remainder of cases, the Bloom filter to be targeted rotates to the next Bloom filter in the set. In another embodiment, the Bloom filter to be targeted may be randomly chosen every time.

Because a single Bloom filter's bits are being unset instead of each Bloom filter simultaneously, the number of bits to be unset in the chosen Bloom filter should be scaled upward in order to achieve a desired average saturation of the Bloom filters as a whole, based on how the random process functions. For example, if there are N Bloom filters, the number of bits to unset may be equal to K*N, be equal to a fraction of K*N such as K*N/2 or 0.9*K*N, be equal to another fixed relation with K*N such as (K*N−1) or (K*N−2), or may be dynamically set to however many bits would need to be unset to reduce saturation below the predetermined threshold.

Figure 6:
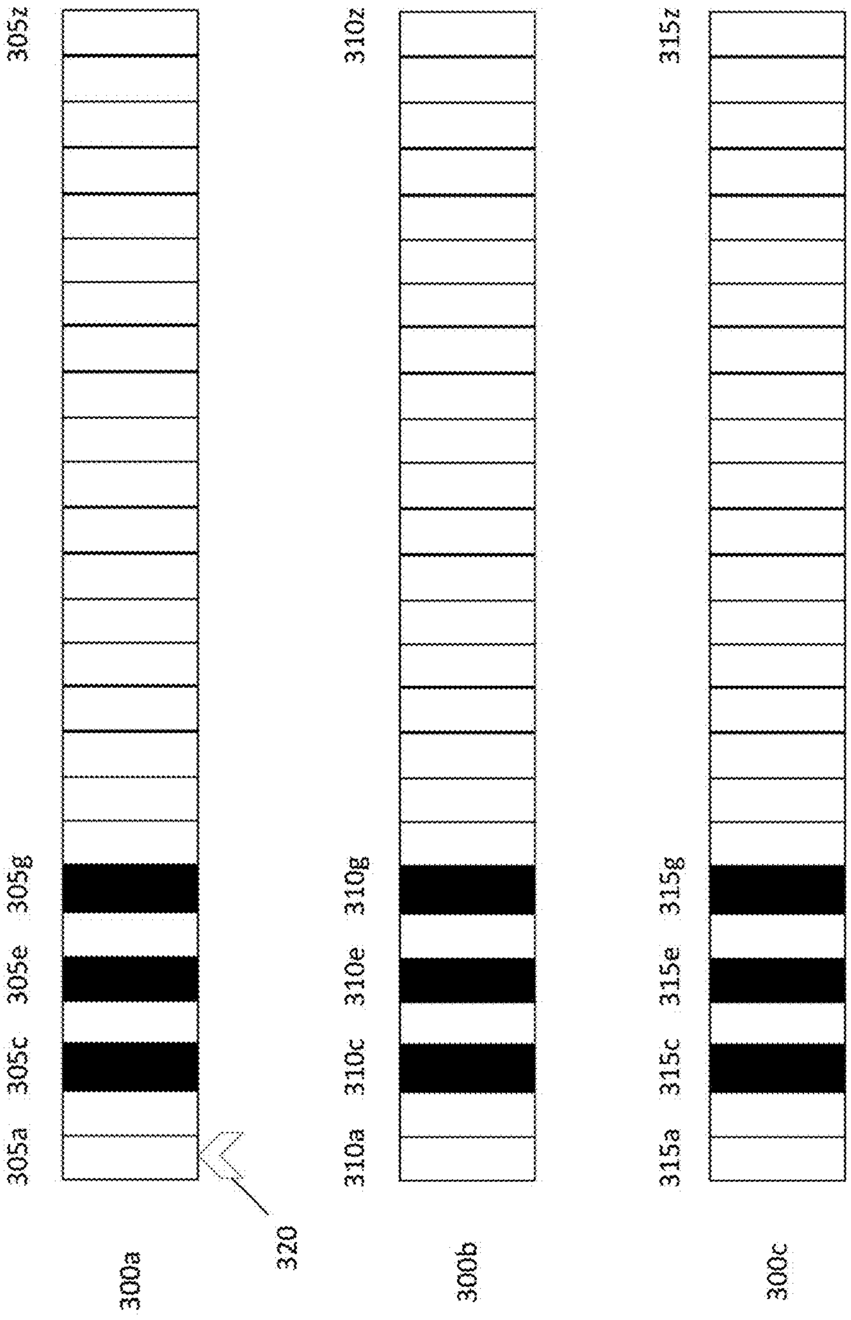
FIG. 6 illustrates, in simplified form, a set of decaying Bloom filters after a first file insertion according to the method illustrated by FIG. 5.
Figure 7:
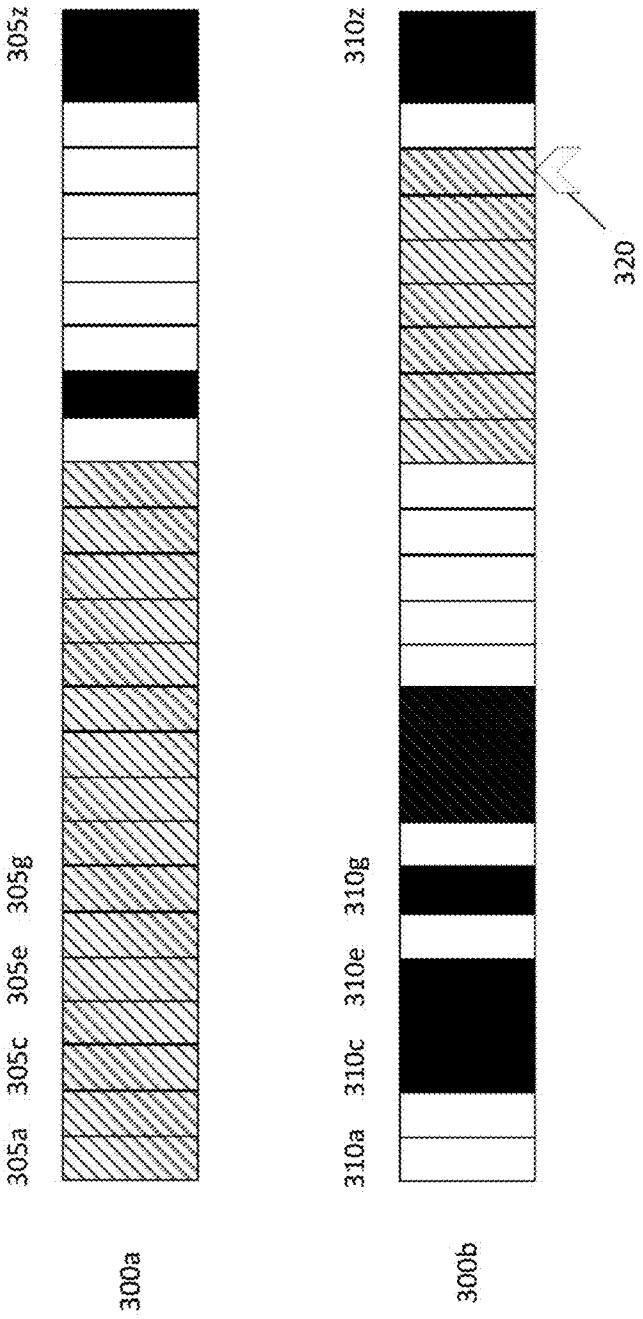
FIG. 7 illustrates, in simplified form, the set of decaying Bloom filters from FIG. 6 after a series of insertions and an alternating decay of bits according to the method illustrated by FIG. 5.

In contrast to the staggered regions of sweep in the method of FIGS. 2-4, the region of each sweep may be contiguous across all the Bloom filters, as illustrated in FIGS. 6 and 7 and discussed further below. In a preferred embodiment, a single pointer is maintained across all the Bloom filters to decide where to unset the next bits. In other embodiments, multiple pointers may be used that are independent of one another.

Figure 9:
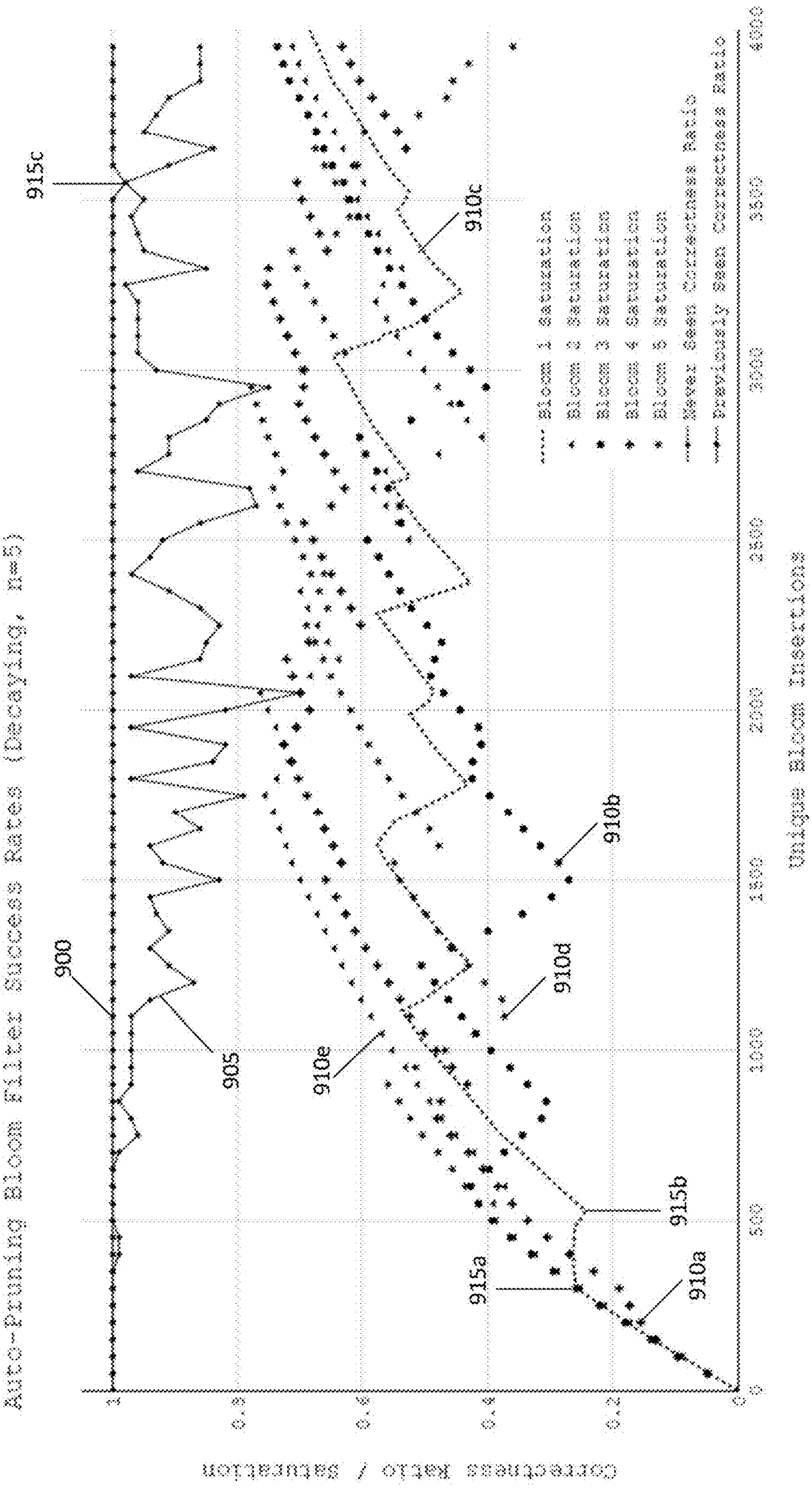
FIG. 9 depicts a graph displaying experimental results of insertions in the second style of alternating decay in a five-Bloom filter system.

As long as the size of the sweep is properly calibrated, the total saturation across all Bloom filters should stabilize at around a desired threshold over time. However, compared to the method of FIGS. 2-4, the saturation may be much more erratic across the Bloom filters, as depicted in FIG. 9 and discussed below.

Again, in this method, the step of insertion is described as preceding the sweep. However, the sweep could instead be ordered before the insertion/check step, or decoupled, such that the sweep occurs periodically on a predetermined schedule.

After the sweep has been performed, any final actions are undertaken (Step 545), including reporting the outcome of the check for prior insertion and transmitting the file to another destination. Afterward, the network sensor 100 returns to waiting for another file to be observed or processing the next already-observed file waiting in a queue (back to Step 505).

For purposes of clarifying how the method of FIG. 5 works in practice, FIG. 6 illustrates, in simplified form, a set of decaying Bloom filters after a first file insertion according to the method illustrated by FIG. 5.

As was depicted in FIG. 3, after a single insertion, three bits may be set in each of the Bloom filters 300. However, in this case, only a single pointer 320 is used and is shared between the three filters 300.

FIG. 7 illustrates, in simplified form, the set of decaying Bloom filters from FIG. 6 after a series of insertions and an alternating decay of bits according to the method illustrated by FIG. 5.

After the same series of files as depicted in FIG. 4 are inserted, the third Bloom filter 300*c* has not yet had any of its bits unset. In contrast, the first Bloom filter 300*a* has had two sets of bits unset, with a greater amount unset than in FIG. 4, and for the third insertion, the pointer continues advancing, but now acting on the randomly chosen second Bloom filter 300*b*. The overall saturation of all three filters together is roughly the same as in FIG. 4, but now an unpredictable number of bits may be set in any particular filter.

Figure 8:
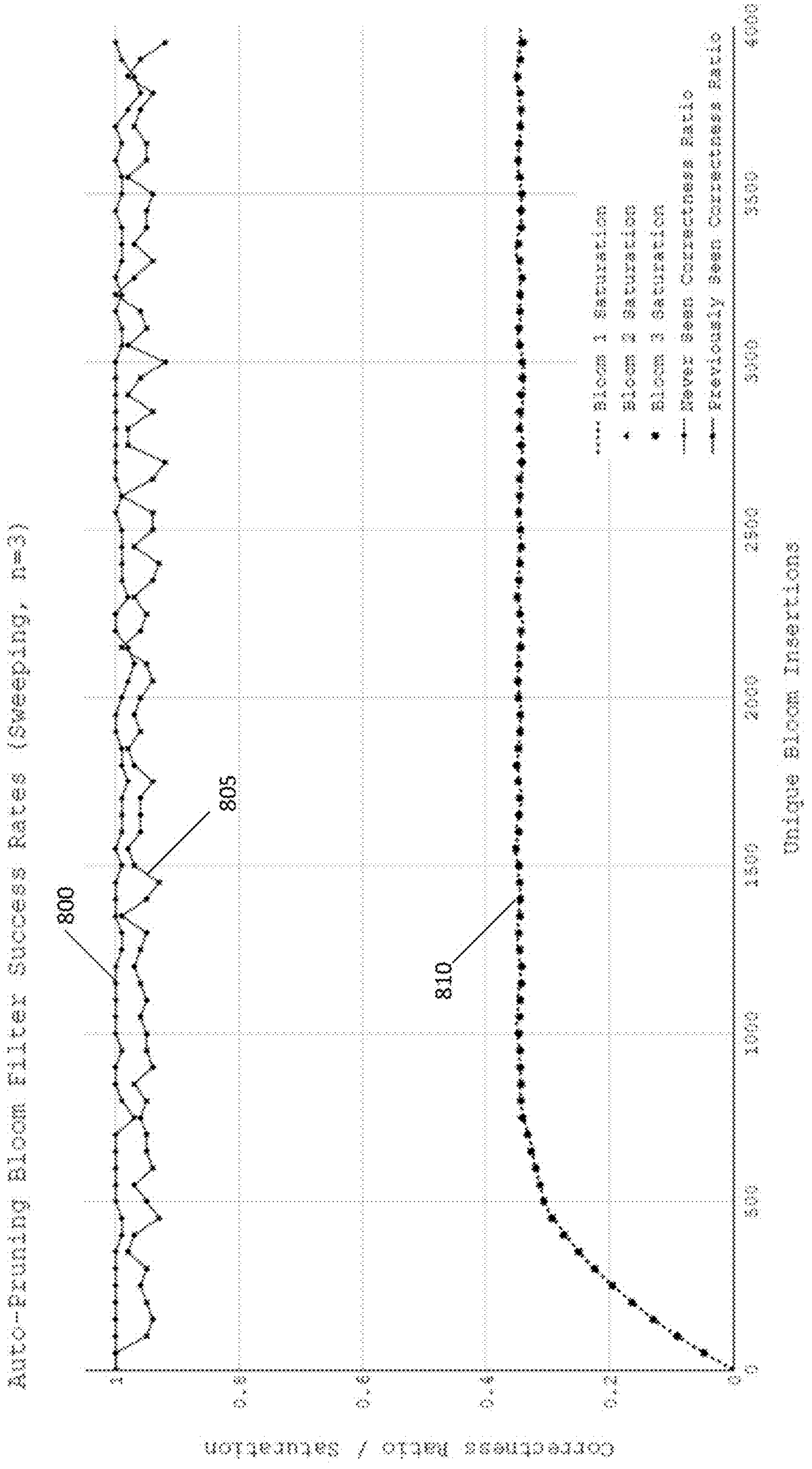
FIG. 8 depicts a graph displaying the experimental results of insertions in the first style of staggered sweeping bit change in a three-Bloom filter system.

FIG. 8 depicts a graph displaying the experimental results of insertions in one style of sweeping bit unsetting, in a three-Bloom filter system, according to the method of FIGS. 2-4.

FIG. 8 depicts the not-before-seen correctness rate 800 (i.e., 100% minus the false positive rate), the previously-seen correctness rate 805 (i.e., 100% minus the false negative rate), and the saturations 810 of three Bloom filters over time as a series of insertions and queries are performed.

Experimental performance shows that the use of three Bloom filters in the method of FIGS. 2-4 can result in a sustained false positive rate below 10%, even after a number of insertions that would, in a single, non-decaying Bloom filter, result in a nearly 100% false positive rate. Although the false negative rate is more erratic than the false positive rate (compare lines 800 and 805 in FIG. 8), a false negative is not as much of an issue during a deduplication process since it only results in wasted computation, not loss of information.

Note also that, since each Bloom filter is swept and has bits unset after each insertion, the saturations 810 are virtually indistinguishable from one another at any given moment, in contrast to the saturations 910 seen in FIG. 9. Even without a deliberate attempt to maintain a particular saturation level, the balance between new bits set and old bits swept and unset will quickly reach an equilibrium—here, at about 35% of bits set, with each of the three Bloom filters having a different set of 35% bits set at any given time.

Even if an infinite number of insertions are performed, the false negative rate, false positive rate, and overall saturation of the Bloom filters will probabilistically remain stable. There may be instances where all newly-set bits correspond to bits that were already set (so that the insertion and unsetting sweep together result in a net decrease in set bits), or that the sweep corresponds solely to bits that were already unset (so that the insertion and sweep together result in a net increase in set bits), but these processes will tend to asymptotically cancel out at a stable saturation rate, and a stable false positive and false negative rate as a function of the saturation.

FIG. 9 depicts a graph displaying experimental results of insertions in one style of alternating decay in a five-Bloom filter system, according to the method of FIGS. 5-7.

FIG. 9 depicts the not-before-seen correctness rate 900 (i.e., 100% minus the false positive rate), the previously-seen correctness rate 905 (i.e., 100% minus the false negative rate), and the saturations 910*a*, 910*b*, 910*c*, 910*d*, 910*e* of five Bloom filters over time as a series of insertions and queries are performed. As can be seen in contrast with FIG. 8, the saturations 910 vary wildly between the five Bloom filters, as only one Bloom filter is being unset at any given moment in time, while the other four continue to fill up. For example, between two moments 915*a* and 915*b*, one saturation 910*c* consistently decreases, as it is repeatedly the one Bloom filter from which bits are being selected for unsetting, until at moment 915*b* a new Bloom filter is selected and another saturation 910*e* begins to decrease instead.

In the test results depicted, false negatives almost never occur (only briefly at moment 915*c*) and other than that brief burst, the false negative rate remains below 1% throughout the experiment. However, the false positive rate is erratic, exceeding 30% at times in this example. Accordingly, a staggered sweep that affects all Bloom filters (as in FIGS. 2-4 and 7) may be preferable in many cases to the alternating decay depicted in FIG. 9, since false negatives are generally preferred to false positives in the intended application. In embodiments where a higher false negative rate is acceptable and a higher false positive rate is not, or other considerations are in play, parameters may be set differently and different numbers of bits, their locations, and their allocations between Bloom filters may be chosen differently.

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 10, below, describes various enabling devices and technologies related to the physical components and architectures described above.

Figure 10:
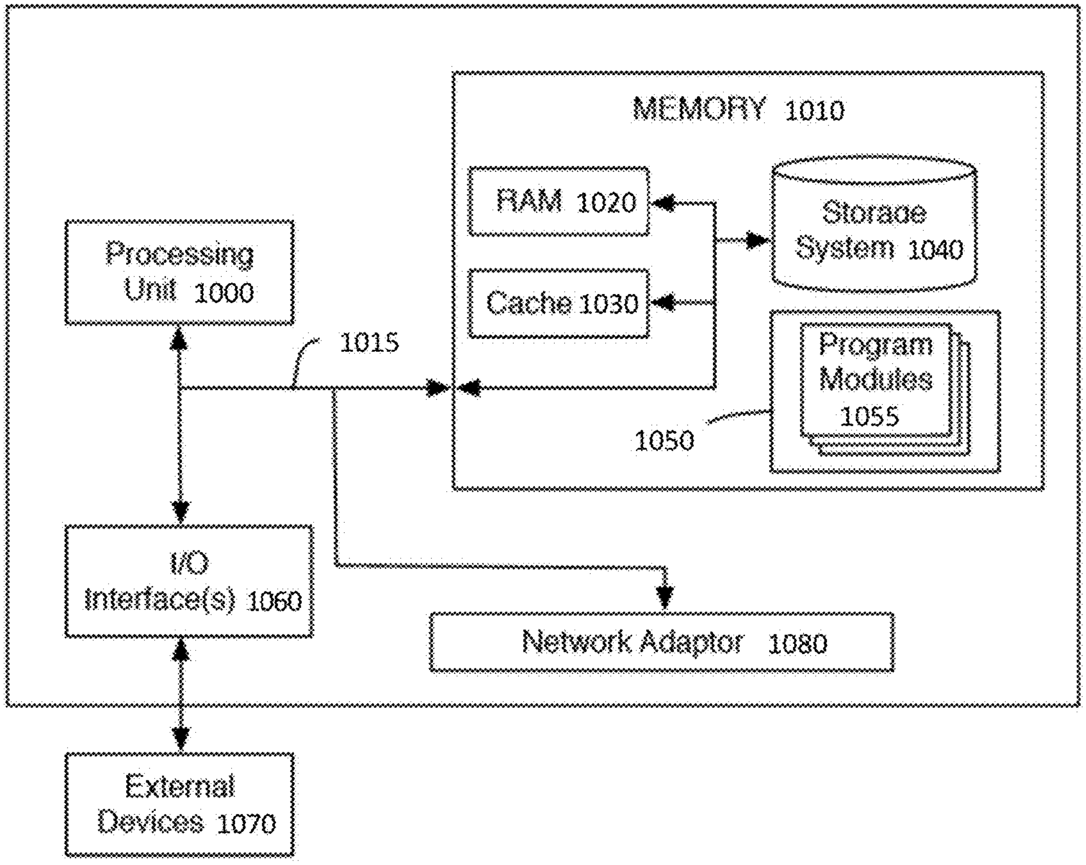
FIG. 10 is a high-level block diagram of a representative computing device that may be utilized to implement various features and processes described herein.

FIG. 10 is a high-level block diagram of a representative computing device that may be utilized to implement various features and processes described herein, for example, the functionality of the network sensors 100, the database 120, the analysis system 125, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 10, the computing device is illustrated in the form of a special purpose computer system. The components of the computing device may include (but are not limited to) one or more processors or processing units 1000, a system memory 1010, and a bus 1015 that couples various system components including memory 1010 to processor 1000.

Bus 1015 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 1000 may execute computer programs stored in memory 1010. Any suitable programming language can be used to implement the routines of particular embodiments including C, C++, Java®, Python®, assembly language, etc. Different programming techniques can be employed such as procedural or object oriented. The routines can execute on a single computing device or multiple computing devices. Further, multiple processors 1000 may be used.

The computing device typically includes a variety of computer system readable media. Such media may be any available media that is accessible by the computing device, and it includes both volatile and non-volatile media, removable and non-removable media.

System memory 1010 can include computer system readable media in the form of volatile memory, such as random access memory (RAM) 1020 and/or cache memory 1030. The computing device may further include other removable/non-removable, volatile/non-volatile computer system storage media. By way of example only, storage system 1040 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1015 by one or more data media interfaces. As will be further depicted and described below, memory 1010 may include at least one program product having a set (e.g., at least one) of program modules that are configured to carry out the functions of embodiments described in this disclosure.

Program/utility 1050, having a set (at least one) of program modules 1055, may be stored in memory 1010 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 1070 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 1060.

In addition, as described above, the computing device can communicate with one or more networks, such as a local area network (LAN), a general wide area network (WAN) and/or a public network (e.g., the Internet) via network adaptor 1080. As depicted, network adaptor 1080 communicates with other components of the computing device via bus 1015. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette or thumb drive, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for receiving and deduplicating data strings transmitted over a computer network, comprising:

one or more sensors detecting data strings while in transit on the computer network; and non-transitory memory comprising instructions that, when executed by one or more processors, cause the one or more processors to:

establish a plurality of Bloom filters, wherein each Bloom filter comprises a fixed-size bit array stored in memory and configured to represent membership of data strings using probabilistic encoding;

detect, using the one or more sensors, a first data string transiting the computer network;

receive the first data string at a computing device via the computer network;

generate, using one or more hash functions, one or more hash values based on the first data string;

map each of the plurality of hash values to corresponding bit positions within each Bloom filter of the plurality of Bloom filters;

set the corresponding bit positions in each Bloom filter based on the mapped hash values, such that each Bloom filter stores a coordinated probabilistic representation of the first data string;

select, for each of one or more Bloom filters of the plurality of Bloom filters, a set of bits, whether presently set or cleared, to be unset, wherein each Bloom filter of the plurality of Bloom filters has a distinct selected set of bits to be unset, and wherein the distinct selected sets of bits are selected based on a plurality of advancing indices, each advancing index indicating a location in its respective Bloom filter at which to begin unsetting bits;

unset each selected set of bits in the one or more Bloom filters to maintain a bounded saturation level of the plurality of Bloom filters over successive insertion operations;

advance each index associated with the one or more Bloom filters to a position beyond the distinct selected set of bits that was unset in the one or more Bloom filters;

receive a subsequent data string at a later moment in time;

query each Bloom filter of the plurality of Bloom filters to determine whether the subsequent data string has been previously inserted, based on a current state of that Bloom filter;

in response to determination that the subsequent data string has not been previously inserted, store the subsequent data string in a storage system; and in response to determination that the subsequent data string has been previously inserted, suppress storage of the subsequent data string.

2. The system of claim 1, further comprising an analysis system to which the first data string is sent for analysis as possible malware at the later moment in time if none of the Bloom filters of the plurality of Bloom filters responds to the query by indicating the data string has been inserted.

3. The system of claim 1, wherein each distinct set of bits selected to be unset does not overlap any other set of bits selected to be unset.

4. The system of claim 1, wherein only one Bloom filter of the plurality of Bloom filters, chosen at least in part by a random number generation, has the set of bits selected to be unset, the set of bits having a magnitude proportionally scaled by a factor equal to a count of Bloom filters in the plurality of Bloom filters, such that saturation of the plurality of Bloom filters as a whole remains constant after setting bits in all Bloom filters and unsetting bits in the only one Bloom filter.

5. The system of claim 4, wherein in response to receiving a second data string, a different one Bloom filter of the plurality of Bloom filters, chosen at least in part by a random number generation, has a different set of bits determined to be unset.

6. The system of claim 1, wherein the instructions, when executed by one or more processors, further cause the one or more processors to:

calculate a current level of saturation of the one or more Bloom filters, and wherein a number of bits in one or more Bloom filters of the plurality of Bloom filters to be unset is dynamically selected based at least in part on the current level of saturation of the one or more Bloom filters.

7. The system of claim 1, wherein a number of bits in one or more Bloom filters of the plurality of Bloom filters to be unset is selected based at least in part on intrinsic properties of each Bloom filter, the intrinsic properties including at least one of number of hashes generated or a size of hashes generated.

8. The system of claim 1, wherein a number of bits in one or more Bloom filters of the plurality of Bloom filters to be unset is selected to ensure that at least a predetermined number of already set bits will be unset.

9. The system of claim 1, wherein bits are selected for unsetting to maintain an invariant property that no Bloom filter from the plurality of Bloom filters has set bits that are a strict superset of another Bloom filter's set bits, despite each insertion operation having set the same bits in each Bloom filter from the plurality of Bloom filters.

10. The system of claim 1, wherein sets of bits are unset periodically in the plurality of Bloom filters prior to the later moment in time.

11. A computer-implemented method for receiving and deduplicating data strings transmitted over a computer network, comprising:

establishing a plurality of Bloom filters, wherein each Bloom filter comprises a fixed-size bit array stored in memory and configured to represent membership of data strings using probabilistic encoding;

detecting, using one or more sensors, a first data string transiting the computer network using one or more sensors;

receiving the first data string at a computing device via the computer network;

generating, using one or more hash functions, one or more hash values based on the first data string;

mapping each of the plurality of hash values to corresponding bit positions within each Bloom filter of the plurality of Bloom filters;

setting the corresponding bit positions in each Bloom filter based on the mapped hash values, such that each Bloom filter stores a coordinated probabilistic representation of the first data string;

selecting, for each of one or more Bloom filters of the plurality of Bloom filters, a set of bits, whether presently set or cleared, to be unset, wherein each Bloom filter of the plurality of Bloom filters has a distinct selected set of bits to be unset, and wherein the distinct selected sets of bits are selected based on a plurality of advancing indices, each advancing index indicating a location in its respective Bloom filter at which to begin unsetting bits;

unsetting each selected set of bits in the one or more Bloom filters to maintain a bounded saturation level of the plurality of Bloom filters over successive insertion operations;

advancing each index associated with the one or more Bloom filters to a position beyond the distinct selected set of bits that was unset in the one or more Bloom filters;

receiving a subsequent data string at a later moment in time;

querying each Bloom filter of the plurality of Bloom filters to determine whether the subsequent data string has been previously inserted, based on a current state of that Bloom filter;

in response to determination that the subsequent data string has not been previously inserted, storing the subsequent data string in a storage system; and in response to determination that the subsequent data string has been previously inserted, suppressing storage of the subsequent data string.

12. The method of claim 11, further comprising identifying the first data string as a duplicate at the later moment in time if any of the Bloom filters of the plurality of Bloom filters responds to the query by indicating the first data string has been inserted.

13. The method of claim 11, wherein each distinct set of bits determined to be unset does not overlap any other set of bits determined to be unset.

14. The method of claim 11, wherein only one Bloom filter of the plurality of Bloom filters, chosen at least in part by a random number generation, has the set of bits determined to be unset, the set of bits having a magnitude proportionally scaled by a factor equal to a count of Bloom filters in the plurality of Bloom filters, such that saturation of the plurality of Bloom filters as a whole remains constant after setting bits in all Bloom filters and unsetting bits in the only one Bloom filter.

15. The method of claim 14, wherein in response to receiving a second data string, a different one Bloom filter of the plurality of Bloom filters, chosen at least in part by a random number generation, has a different set of bits determined to be unset.

16. The method of claim 11, further comprising:

calculating a current level of saturation of the one or more Bloom filters, and wherein a number of bits in one or more Bloom filters of the plurality of Bloom filters to be unset is dynamically determined based at least in part on the current level of saturation of the one or more Bloom filters.

17. The method of claim 13, wherein a number of bits in one or more Bloom filters of the plurality of Bloom filters to be unset is determined based at least in part on intrinsic properties of each Bloom filter, the intrinsic properties including at least one of number of hashes generated or a size of hashes generated.

18. The method of claim 11, wherein a number of bits in one or more Bloom filters of the plurality of Bloom filters to be unset is determined to ensure that at least a predetermined number of already set bits will be unset.

19. The method of claim 11, wherein bits are selected for unsetting to maintain an invariant property that no Bloom filter from the plurality of Bloom filters has set bits that are a strict superset of another Bloom filter's set bits, despite each insertion operation having set the same bits in each Bloom filter from the plurality of Bloom filters.

20. The method of claim 11, wherein sets of bits are unset periodically in the plurality of Bloom filters prior to the later moment in time.

* * * * *